(12) United States Patent
Bain et al.

(10) Patent No.: US 6,288,715 B1
(45) Date of Patent: Sep. 11, 2001

(54) SCREENSAVER MESSAGING SYSTEM

(75) Inventors: Lynda L. Bain, Boulder; Bradley Reeves, Berthoud, both of CO (US)

(73) Assignee: Qwest Communications Int'l., Inc., Denver, CO (US)

( * ) Notice: Subject to any disclaimer, the term of this patent is extended or adjusted under 35 U.S.C. 154(b) by 0 days.

(21) Appl. No.: 09/309,356

(22) Filed: May 11, 1999

(51) Int. Cl.[7] .................................................. G09G 5/00
(52) U.S. Cl. ............................................ 345/211; 345/347
(58) Field of Search ................................... 345/211, 329, 345/333, 339, 340, 346, 347, 348, 352; 713/320, 321, 300

(56) References Cited

U.S. PATENT DOCUMENTS

| | | | |
|---|---|---|---|
| 5,680,535 | 10/1997 | Harbin et al. | 395/173 |
| 5,819,284 | * 10/1998 | Farber et al. | 345/329 |
| 5,850,220 | * 12/1998 | Motai | 345/339 |
| 5,877,765 | 3/1999 | Dickman et al. | 345/349 |
| 5,980,264 | * 11/1999 | Lundberg . | |
| 6,144,363 | * 11/2000 | Alloul et al. . | |

* cited by examiner

*Primary Examiner*—Regina Liang
(74) *Attorney, Agent, or Firm*—Marsh Fischmann & Breyfogle, LLP

(57) ABSTRACT

A screensaver method and apparatus provides a communication system for a computer which allows a visitor to an office or workspace to leave an electronic message. A screensaver program is installed on a personal computer which provides a dialogue box on the display screen after a predetermined period of inactivity. The dialogue box includes areas for a computer user to provide instructions for visitors to the office to enter messages as well as places for the visitor to, through use of the mouse and keyboard, enter and transmit an e-mail message for the computer user. Once the message has been entered and the user transmits, the screensaver communications program converts the entered message and other information to a predetermined format and transmits it to the assigned destination address. The computer user who was absent may then upon return, remove the dialogue box from the screen and access the e-mail message.

18 Claims, 7 Drawing Sheets

SCREENSAVER MESSAGING SYSTEM

FIELD OF THE INVENTION

The invention described herein relates to a method and apparatus for transmitting e-mail messages, and more particularly to transmitting e-mail messages through use of a screensaver program.

BACKGROUND OF THE INVENTION

Currently, a number of different modes exist for people to communicate if they are not in the physical presence of the other person. The modes of communications may e-mail, fax, electronic pages, telephonic communications (voice), or even the written letter. In the office environment, a person may employ any of the above mentioned modes to communicate with another party, however in the situation where a person physically visits the workspace of another, and finds that the person they intended to visit is not present, the available means for leaving a message may be limited. One way to leave a message may be to find a pen and piece of paper and write a note. However if the visitor doesn't possess a pen or paper, or feels uncomfortable looking through the workspace of another in order to find these items, this may not be a practical way to leave a message. Further, there is a chance the message may get lost in other papers in the office or workspace.

A business tool which is located in most offices and workspaces and may be used for communications purposes is the personal computer. A personal computer with a network connection may be used to send and receive e-mail messages in addition to a number of other business functions. Because the replacement or repair of computer components may be expensive, various devices have been developed in order to extend the life of the components of a computer. One device in particular is the screensaver which is employed to extend the life of a display monitor for a computer. Screensavers usually activate after a predetermined period of inactivity of the computer, and usually generate an image which moves about the display screen in order to avoid burn in of an image into the screen.

SUMMARY OF THE INVENTION

The inventor has recognized that in situations where a person visits an office or workspace of another, and finds that the person is absent, the computer located in the office or workspace, which includes a connection to a local network, may be employed to transmit a message to the absent party. Further, the inventor has recognized that such a messaging feature may be incorporated into a screensaver program employed by the computer.

The screensaver messaging system described herein may be incorporated into the operating system for a computer device, such as a personal computer. Included in the personal computer may be a central processing unit, a memory, a display as well as user input devices such as a keyboard and a mouse.

Included in the memory is a screensaver communications program. Part of the screensaver program is a display graphic for a dialogue box which may be displayed on a computer screen after a predetermined period of inactivity for the computer. The dialogue box may include designated areas for typing in information such as a title for the message, a name of a person leaving the message, as well as the message itself. The dialogue box may also be displayed for typing in a password such that the computer user may deactivate the screensaver and resume normal functions for the computer. Further, a hot key may be assigned on the keyboard for selective activation and deactivation of the screensaver function.

A connection may be provided between the screensaver program and the data network. E-mail functionality is incorporated into the program, and through use of this, e-mail messages with a destination address may be transmitted by the screensaver program over the network. The screensaver program further includes the functionality to convert alphanumeric messages typed in the dialogue box to the appropriate format for transmission.

In operation, the screensaver communications program may first be installed on the personal computer. Upon installation, the operator of the computer may input various custom features for operation of the screensaver and the transmission of messages. The computer user may provide a default e-mail address to which all messages entered into the dialogue box will be transmitted. In one aspect of the invention this will be the e-mail address of the user of the computer. Other options which the computer user may input include written instructions which will appear in the dialogue box for persons wishing to leave a message, the length of time before the screensaver program actuates and the dialogue box appears on the screen, and whether the screensaver functions include password protection for the computer.

Once in the operational mode, and after a predetermined period of activity for the computer, the dialogue box will appear on the screen. In one aspect of the invention, the dialogue box will periodically move to different positions on the screen as is typical for a screensaver program. At the option of the computer user, instructions for leaving a message may appear in the dialogue box. Also included with the dialogue box may be areas to enter a name for the visitor, title for a message, a message, as well as a return phone number or E-mail address. Upon viewing the dialogue box, the visitor may type in a title and message and upon selection of a transmit or enter key, transmit the e-mail message to the displayed address. A button may also be provided as part of the dialogue box for canceling the entry and transmission of the message.

Once transmission of the message has been selected, the system formats the e-mail message. If the subject line is blank, a default message subject may be inserted. Further, a priority may also be selected for the message. With regards to the formatting of the message, the screensaver program may also include such information as the time of day in which the message was created and transmitted. The message is then transmitted to the E-mail address programmed in by the computer user.

When the computer user returns and wishes to operate the computer, a special hot key may be selected which automatically clears the screensaver dialogue box, or it may present a password dialogue box which requires the entry of a password before access is granted to the other applications in the computer.

In another aspect of the invention, the system may include a screen display through which a computer user may interact with to customize the operation of the system. Through this display a computer user may turn the program on or off, set a period of inactivity before the system is activated, enter a default E-mail address to direct all messages to, as well as enter a message which all visitors will read.

In yet another aspect of the invention, the screensaver messaging system employed by the computer user may be used in conjunction with an automatic reply function. If a visitor to the computer transmits an e-mail message to the computer user using the screensaver messaging system, the computer user may have programmed the system such that an automated e-mail is returned to the screen from which the message was sent, and this message may contain information regarding the whereabouts and time of return of the computer user.

DETAILED DESCRIPTION

Figure 1:
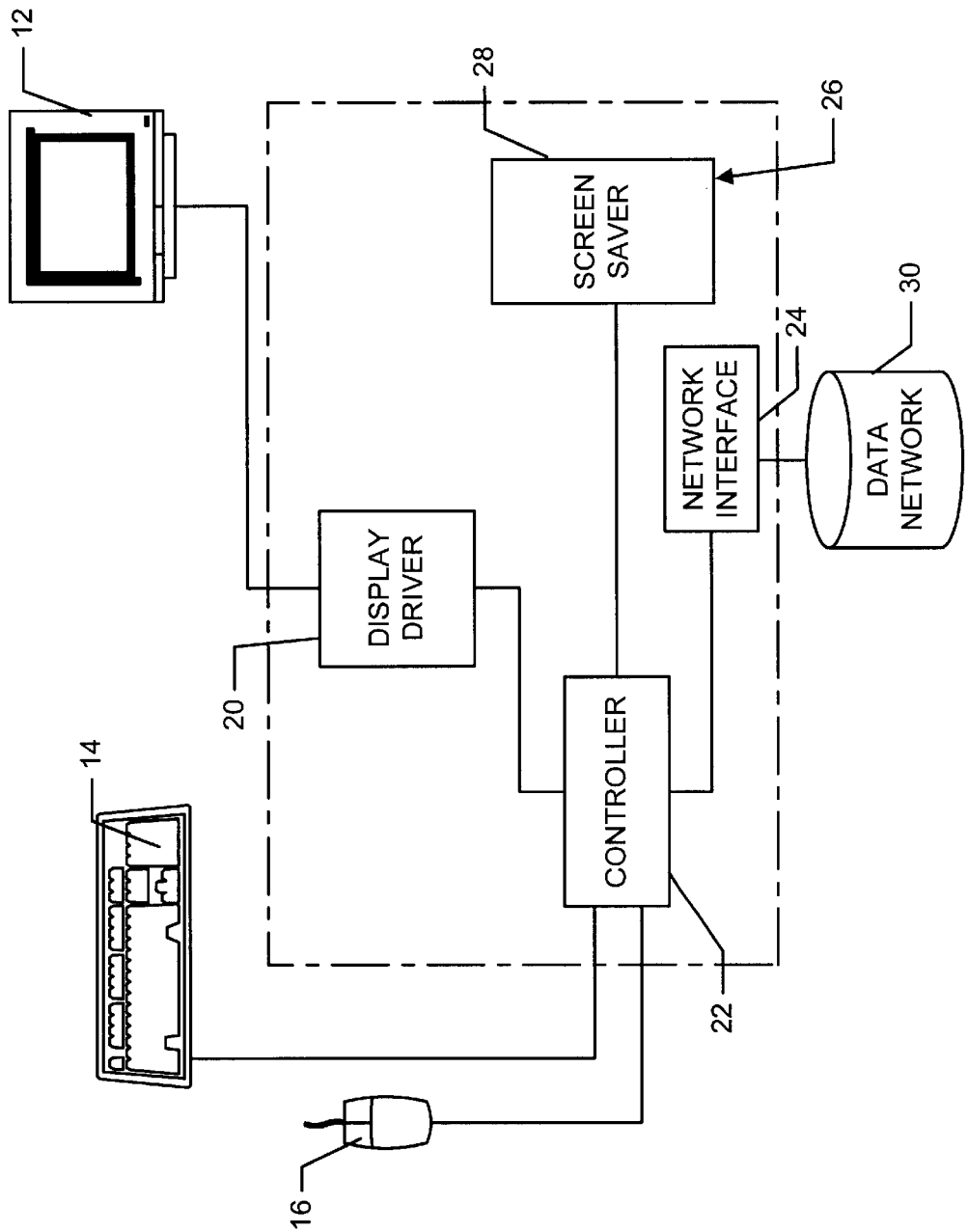
FIG. 1 discloses a system diagram for a computer which includes the screensaver messaging system.

Disclosed in FIG. 1 is a system diagram for a computing device, such as a personal computer, which may incorporate the screensaver communications system described herein. As is well-known, a personal computer is made up of a number of different components. The central processing unit (CPU) 10 includes all the electronic components employed to perform the various computations. Attached to the CPU is a computer display 12 which presents the information to be viewed to the computer user. This display may be a cathode ray tube (CRT), or liquid crystal display (LCD). Other devices in connection with the CPU include keyboard 14 and mouse 16 which are used to enter and manipulate data which appears on the computer display.

Components within the CPU include controller 22 which coordinates the data signals within the CPU and provides various computational functions. The display driver 20 acts as an interface between the controller and the computer display 12 and provides the necessary processing in order to present information on the computer display. The memory 26 includes all the stored data and programs employed by the computer and is accessible by the controller 20.

Included in the memory is the screensaver communications program 28. In order to provide for e-mail communications, an interface 24 is provided between the controller 22 and a data network 30 such as the WorldWide Web, or a local area network (LAN). This interface may be a computer modem which performs for telephonic communications, or may be a backbone connection to the LAN.

The screensaver messaging system stored in memory provides the functionality for a visitor who comes upon a computer in which the operator is not present to leave a message for the operator through use of an e-mail program. As is well-known, screensaver programs are employed to extend the life of the computer display. The longer that an image is displayed on one part of the display screen the greater chance that it will burn into the screen and permanently damage the component. Thus a screensaver program presents an image or series of images which move around the screen in order to avoid burn in.

As part of the screensaver program, the present invention provides the capability for a visitor to an unattended computer with a connection to a data network, to enter a message through a display graphic, or dialogue box, which appears on the display screen. The screensaver program includes the necessary protocols to convert the typed-in message to an e-mail message and transmit the information to the desired destination address.

In operation, before the system may be employed, the screensaver program is installed on the computer and is resident in the memory. Through the use of various dialogue boxes which may be selectively activated by the computer user, the operation of the screensaver program may be customized. The customization options may include setting the period of inactivity before the screensaver program activates, entering a designated address to which the e-mail messages will be transmitted, whether the screensaver will operate in a password protection mode and entering a default title for messages if one is not manually entered by a visitor. The system may further be programmed to include times and dates in the messages which are transmitted.

Figure 2:
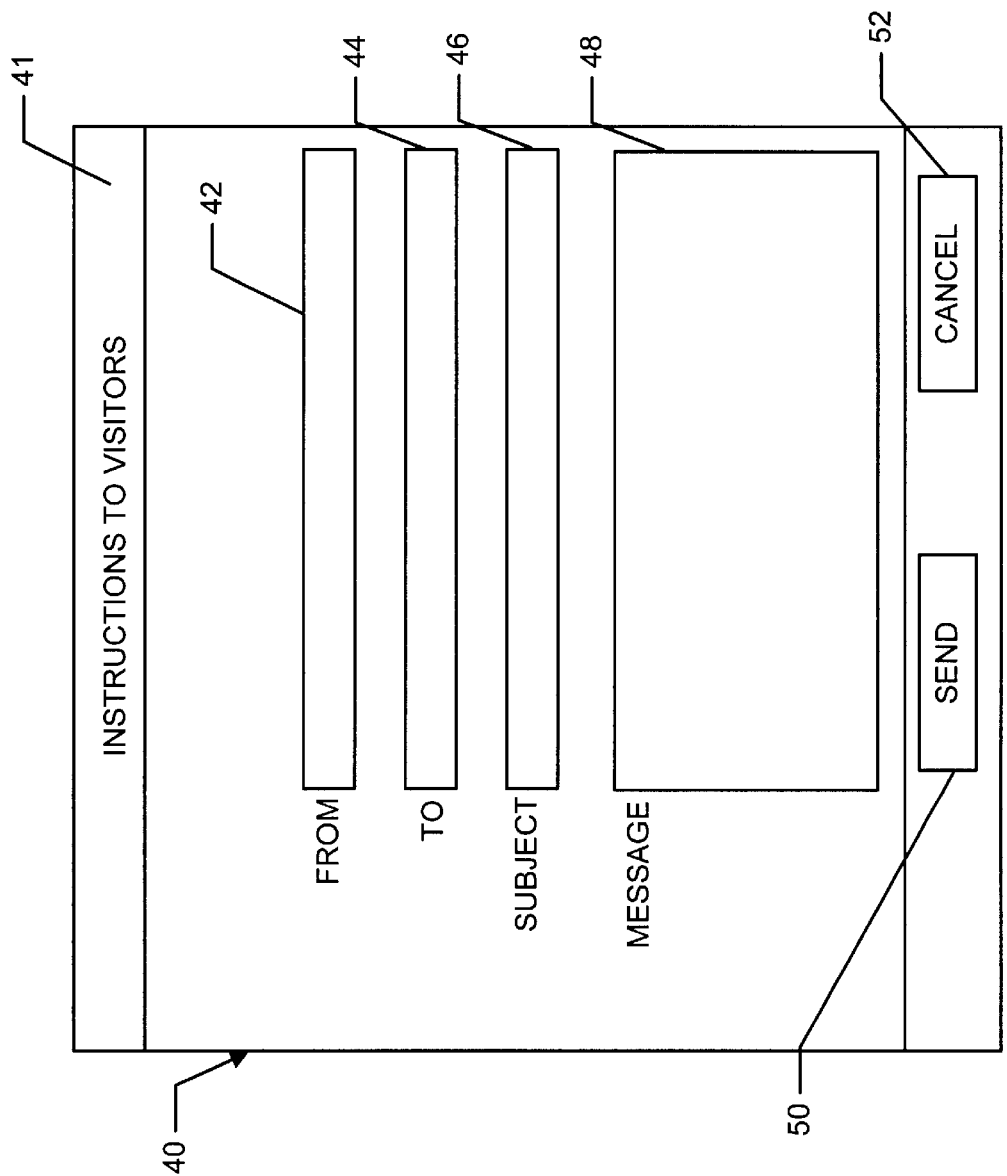
FIG. 2 discloses a dialogue box which may be disclosed on a computer screen.

Disclosed in FIG. 2 is an example of a dialogue box which may appear on a computer display when the screensaver program is activated. After a predetermined amount of inactivity with regards to operations of the computer, the dialogue box will appear and according to the options entered by the computer user it may periodically move about the screen in order to avoid burn-in in a particular area of the display screen.

The dialogue box 40 includes a message area 41 in which the computer user has previously entered a message which is to be read by those visiting the computer user. Included therein may be instructions for typing and sending a message to the computer user as well as information to their whereabouts. The visitor may employ the keyboard and mouse to enter alphanumeric information in any of the boxes presented in dialogue area 41. Box 42 includes LAN area where the computer user may enter in a specific code or address which indicates that message was sent while in the screensaver mode. In dialogue box 44, a visitor may enter a return telephone number or e-mail address. In area 46, a visitor may enter a subject heading for a message to be entered, or the computer user can place a default subject heading which would indicate that the message was sent while the computer was in the screensaver mode.

With regards to typing a message, area 48 is provided and through use of the mouse and keyboard, the visitor may type in a message for the computer user. Finally, the send button 50 and cancel button 52 allows the visitor to either send or cancel the transmission of an e-mail message.

Figure 3:
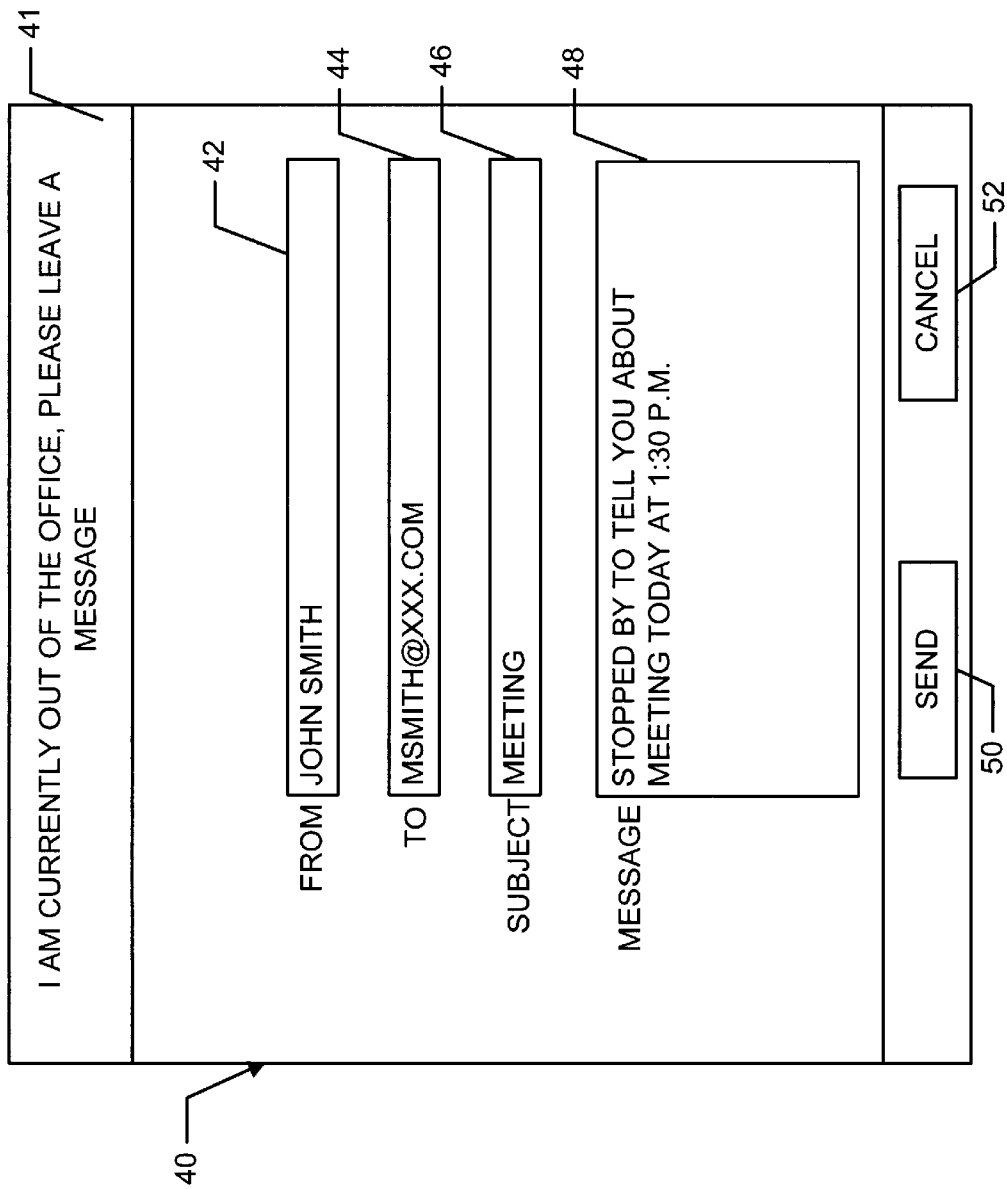
FIG. 3 discloses an example of a dialogue box which includes a sample message and sample e-mail address.

Disclosed in FIG. 3 is an example of a dialogue screen in which information has been provided by both the computer user and the visitor. As was discussed previously, in dialogue box 41 display a message on the computer user's whereabouts and instructions to leave a message. The visitor has typed a name and return contact information in boxes 42 and 44. As can be seen in boxes 46 and 48, the visitor wishes to schedule a "meeting" and has stopped by to inform the computer user about it.

An important consideration in employing the screensaver communications program described herein is that sufficient security be provided such that visitors who come upon the computer may enter and transmit a message to the computer user, but may not have further access to information and applications on the computer. One option to provide this type of security is to password protect access to the system.

Figure 4:
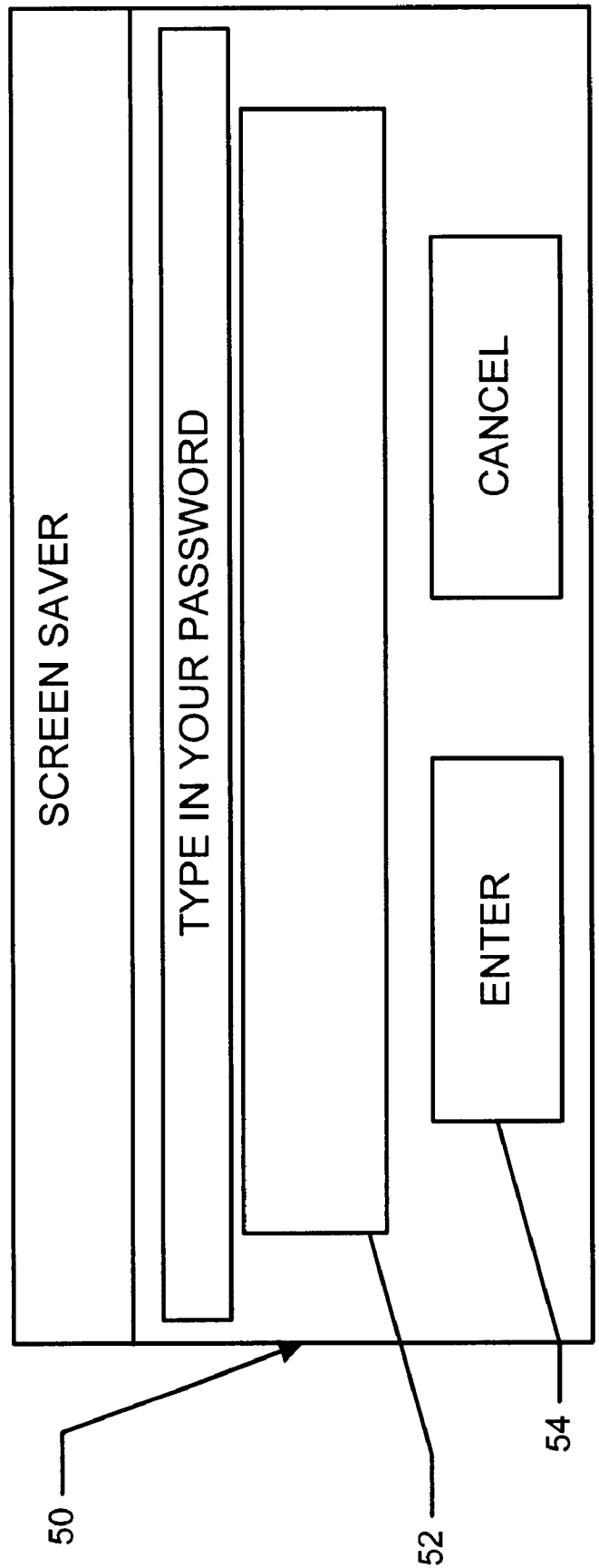
FIG. 4 discloses a dialogue box displayed when the screensaver messaging system is password protected.

As described above, the screensaver dialogue box will appear on the display screen after a predetermined period of computer inactivity. In order for a computer user to remove the dialogue box and resume normal operations, a hot key may be programmed into the screensaver program which, when depressed on the keyboard, removes the dialogue box from the display screen. In one aspect of the invention, once the hot key is pressed, a dialogue box such as that shown in FIG. 4 may be presented to the computer user. Through use of the mouse and keyboard, the computer user may enter the appropriate password and once this is read by the system, access is granted to the computer system applications.

Figure 5:
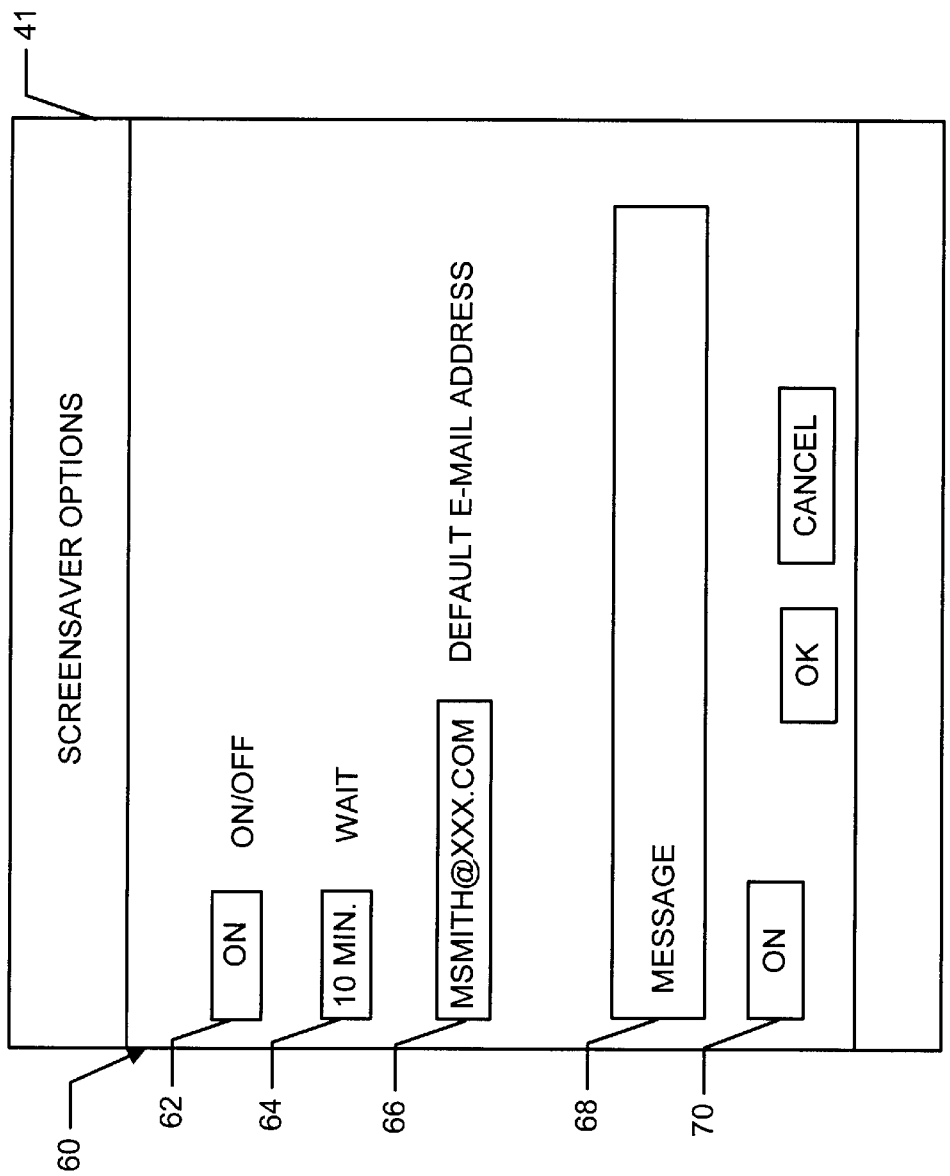
FIG. 5 discloses an example of an automated reply e-mail which may appear on the computer screen after a message has been transmitted employing the screensaver messaging system.

Once access is granted to the computer system the computer may active or deactivate a number of custom features relating to the use of the screensaver system. Disclosed in FIG. 5 is a display screen 60 which a system user may access in order to customize the operation of the system. One function is whether to turn the system on or off. By entering either "on" or "off" in dialog box 62, the system may be either activated or deactivated. The time period before the screensaver activates may be entered through dialog box 62.

As discussed above, when a visitor selects the submit button when viewing the data entry screen the information is transmitted to the computer user's E-mail address. This E-mail address, or any other desired E-mail address may be entered in dialog box 66. The message which the computer user wishes visitors to see may be entered through dialog box 68. Also, if the computer user wishes to activate the vacation mode this may be done through dialog box 70. If a computer user does activate the vacation mode, there may be a further query to enter a message which will be included in the automatic reply message.

Figure 6A:
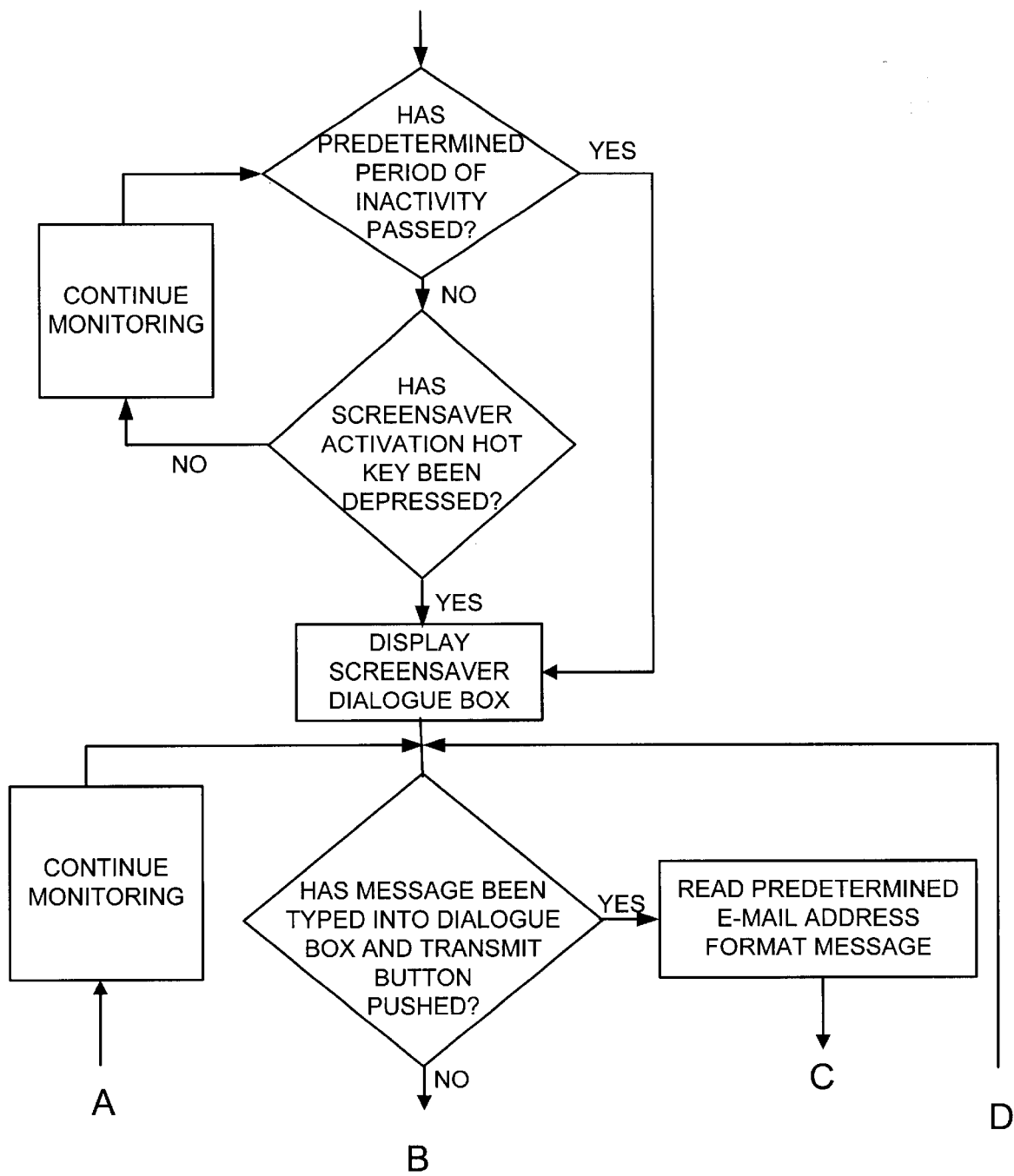
FIG. 6 discloses a flow diagram which describes the operation of the screensaver messaging system.
Figure 6B:
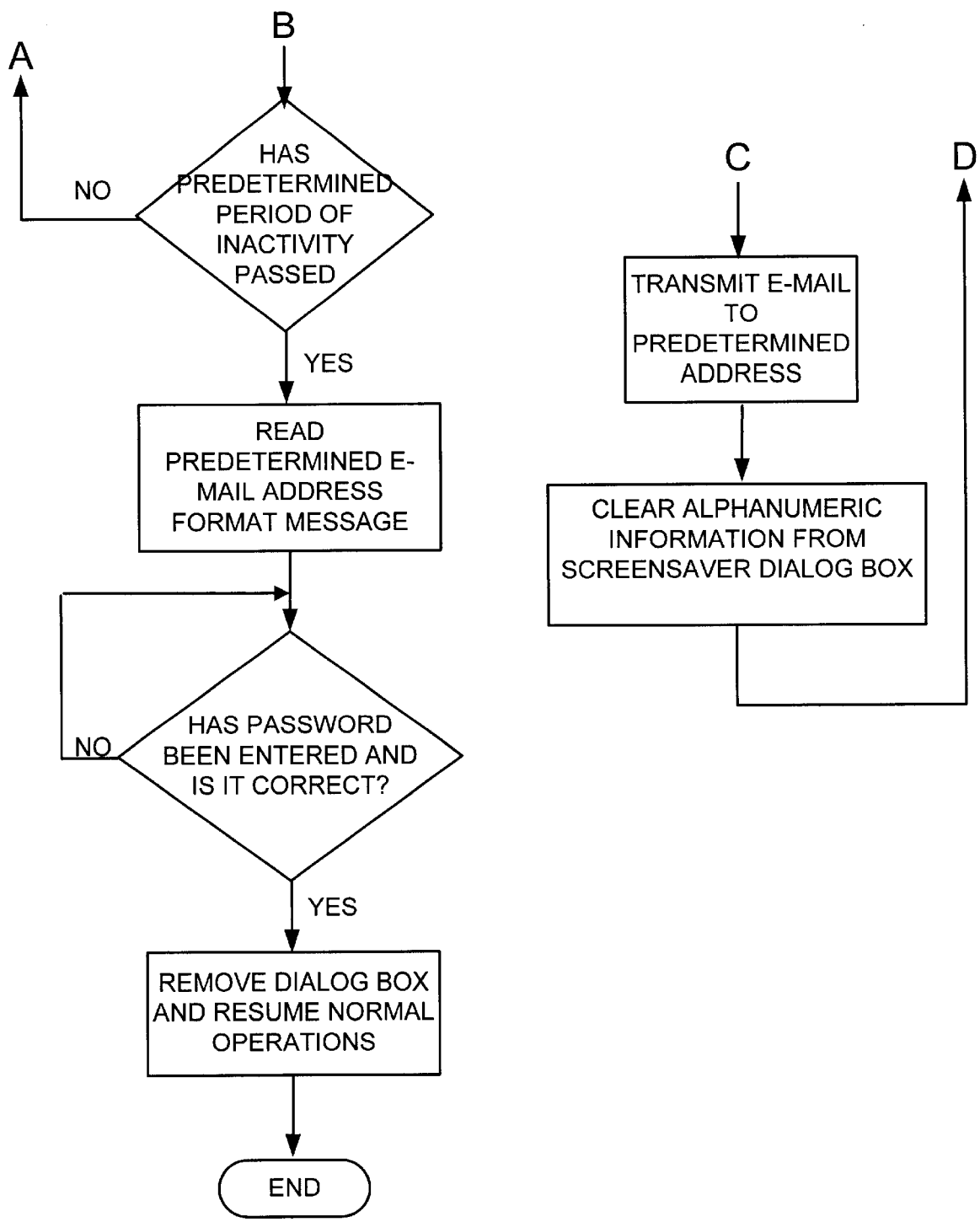

Disclosed in FIGS. 6a and 6b is a flowchart which describes in detail the operations performed by the screensaver communications program. As described above, the screensaver program also operates as a normal screensaver and monitors the activity of the computer user. After a predetermined amount of computer inactivity, the screen saver program activates, and a display graphic of a dialogue box for entering messages is displayed. If a hot key for activating the system exists, upon depression of this key or a sequence of keys, the dialogue box appears on the screen. The screensaver monitors the system until either of these events occur.

Once the dialogue box is displayed on the computer screen, an idle period occurs until either a visitor finishes typing in a message and presses the transmit key, or a preprogrammed hot key is depressed which clears the dialogue box from the computer screen. As is described above, if this hot key is depressed, a query may be presented to enter a password to resume normal operations of the computer system. If the correct password is entered, the dialogue box is removed and normal operations are resumed.

If while the dialogue box appears on the computer screen, and a visitor types in a message, upon depression of the transmission button, the program will convert the alphanumeric message typed in the dialogue box to the predetermined format for transmitting an e-mail. The program will also process information relating to the destination address for the e-mail, as well as information with regards to the origin of the message. As was described above, the computer user may customize the program to include any of this information. Once all the information has been processed and formatted for the appropriate protocol, it is transmitted via the network connection to the designated destination address.

A feature which may be incorporated into the screensaver communications system is the ability to receive and display E-mail messages. Many E-mail systems currently provide the functionality to immediately send a reply E-mail message to an E-mail address from which it has just received a message. This allows the computer user to inform another party of his or her whereabouts if the message is regarding a time sensitive issue. In the invention described herein, the screensaver program is adapted to receive and display the automatically returned messages. This allows the computer user to provide notification to every person who sends an E-mail or visits the office, as to the whereabouts and time of return of the computer user.

The present system may also be employed to provide messaging functionality in situations where the computer is not in connection with a data network. In this situation, the same interface screen as that disclosed in FIG. 2 is displayed on the computer screen. Once a visitor has entered the information in the dialog boxes and pressed the submit button, a file is created in a chosen directory in the memory of the computer. This file contains all the same information as that discussed above with regards to the E-mail messages. Upon return of the computer user and deactivation of the screen saver program this file may be located in memory and its contents displayed on the computer screen. A special notice may be provided on the screen to notify the computer user that a number of messages have been left.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A screen saver communications system for use in a computing device which is connectable to a data network comprising:

a display graphic which is presented on a display monitor after a predetermined period of inactivity for the computing device and which may be removed upon performance of a predetermined action, said display graphic including:

at least one dialogue box in which an alphanumeric message may be typed through use of a keyboard and mouse for the computing device; and an activation button located proximate to the at least one dialogue box which provides for further processing of the alphanumeric message; and an E-mail processing module which upon selection of the activation button, transmits the alphanumeric message to a predetermined E-mail address over the data network.

2. The system of claim 1 wherein the computing device is a personal computer and the data network is comprised of at least one of: the world wide web or a local area network.

3. The system of claim 1 wherein the predetermined E-mail address is associated with computing device on which the alphanumeric message was entered.

4. The system of claim 1 wherein the display graphic is programmed to move about the display screen at predetermined intervals.

5. The system of claim 1 wherein the display graphic may be removed from the display through selection of a preprogrammed key on the keyboard.

6. The system of claim 1 wherein the E-mail module automatically formats the alphanumeric message in a predetermined format for transmission to the predetermined E-mail address.

7. The system of claim 5 wherein password protection is provided for the computing device through display of a password dialog box upon depression of the preprogrammed key, where a predetermined password must be entered into the password dialogue box to access applications in the computing device.

8. The system of claim 1 wherein the E-mail processing module is adapted to receive and display automated return E-mails in response to the transmission of the alphanumeric message to a predetermined E-mail address.

9. The system of claim 1 wherein no connection to the data network is established and the alphanumeric message typed into the dialog box is stored in an accessible file in a memory for the computing device.

10. The system of claim 1 further including a display for entering custom information which may include at least one of: system activation and deactivation, period of inactivity before the system is activated, default E-mail address, message for visitors, and activation and deactivation of vacation mode.

11. A method of generating and transmitting an E-mail message from a computing device connected to a data network, comprising the steps of:

providing a display graphic which appears on a display screen for the computer after a predetermined period of inactivity;

displaying at least one dialogue box within the display graphic in which an alphanumeric message may be entered;

detecting selection of an activation button within the display graphic and converting the alphanumeric message entered into the at least one alphanumeric message to an E-mail message to be transmitted to a predetermined address; and transmitting the E-mail message via the data network to the predetermined E-mail address.

12. The method of claim 11 wherein display graphic is part of a screen saver program which appears on the display screen after a predetermined period of inactivity of the computing device.

13. The method of claim 12 further comprising the step of moving the display graphic to different location on the display screen at predetermined intervals.

14. The method of claim 11 further comprising the step of deactivating the display graphic through selection of a predetermined key on the keyboard.

15. The method of claim 14 further comprising the step of displaying a password dialogue box upon selection of the predetermined key, and upon detection of the entry of a predetermined password in the password dialogue box, providing access to application in the computing device.

16. The method of claim 11 further comprising the step of detecting and displaying contents of an automated return E-mail message.

17. The method of claim 11 wherein if a connection to a data network is not established, the alphanumeric message is stored in an accessible file in a memory for the computer.

18. The method of claim 12 wherein a screen display is presented for entering custom information, the custom information includes at least one of: activating or deactivating the screensaver program, entering a period of activating before the screensaver program is activated, entering a default email address, entering a message which will be read by visitors, and activating and deactivation of a vacation mode.

* * * * *